United States Patent [19]
Allen

[11] 3,762,802
[45] Oct. 2, 1973

[54] AUTOMOBILE VIEWING SCOPE
[75] Inventor: Levi Allen, Crown Point, N.Y.
[73] Assignee: The Raymond Lee Organization, Inc., New York, N.Y.; a part interest
[22] Filed: Oct. 5, 1971
[21] Appl. No.: 186,732

[52] U.S. Cl.............. 350/307, 350/7, 350/299
[51] Int. Cl. ............................. G02b 5/08
[58] Field of Search.............. 250/7, 288, 289, 250/299, 301–307

[56] References Cited
UNITED STATES PATENTS

| | | | |
|---|---|---|---|
| 1,837,085 | 12/1931 | Gelder | 350/303 |
| 3,493,295 | 2/1970 | Kobrehel | 350/307 |
| 2,871,761 | 2/1969 | Snyder | 350/307 |
| 2,803,160 | 8/1957 | Marston | 350/289 |
| 2,472,438 | 6/1949 | Price | 350/307 |

Primary Examiner—Ronald L. Wibert
Assistant Examiner—Michael J. Tokar
Attorney—Howard I. Podell

[57] ABSTRACT

A rotatable mirror device mounted in front or in the rear of an automobile so as to give the driver a direct view of otherwise blind areas to his immediate right or left, and for particular viewing use in parking operations and in driving out of blind driveways. The device is retractable so as not to interfere with the normal direct view when driving. The mirrors may be mounted so as to form the four sides of a cube which is rotatable about the vertical axis, or the mirror element may be in the form of a vertical plane, rotatable about the vertical axis.

1 Claim, 3 Drawing Figures

PATENTED OCT 2 1973 3,762,802

INVENTOR.
LEVI G. ALLEN
BY [signature]
AGENT

AUTOMOBILE VIEWING SCOPE

SUMMARY OF THE INVENTION

The object of my invention is a means of enabling motorists to observe the immediate area to either side of the automobile, particularly when such side areas are blocked by buildings, fences, or bushes which terminate just short of the front or rear of the automobile.

My invention consists of a rotatable viewing scope, said scope consisting of one or more mirror surfaces rotatable about a vertical axis, with means for the driver to control the degree of rotation, and means for the driver to retract the viewing scope out of his field of vision, after he has reached the open road.

BRIEF DESCRIPTION OF THE DRAWINGS

The object and features of my invention may be understood with reference to the following detailed description of an illustrative embodiment of the invention, taken together with the accompanying drawing in which.

DESCRIPTION OF THE PREFERRED EMBODIMENT

Figure 1:
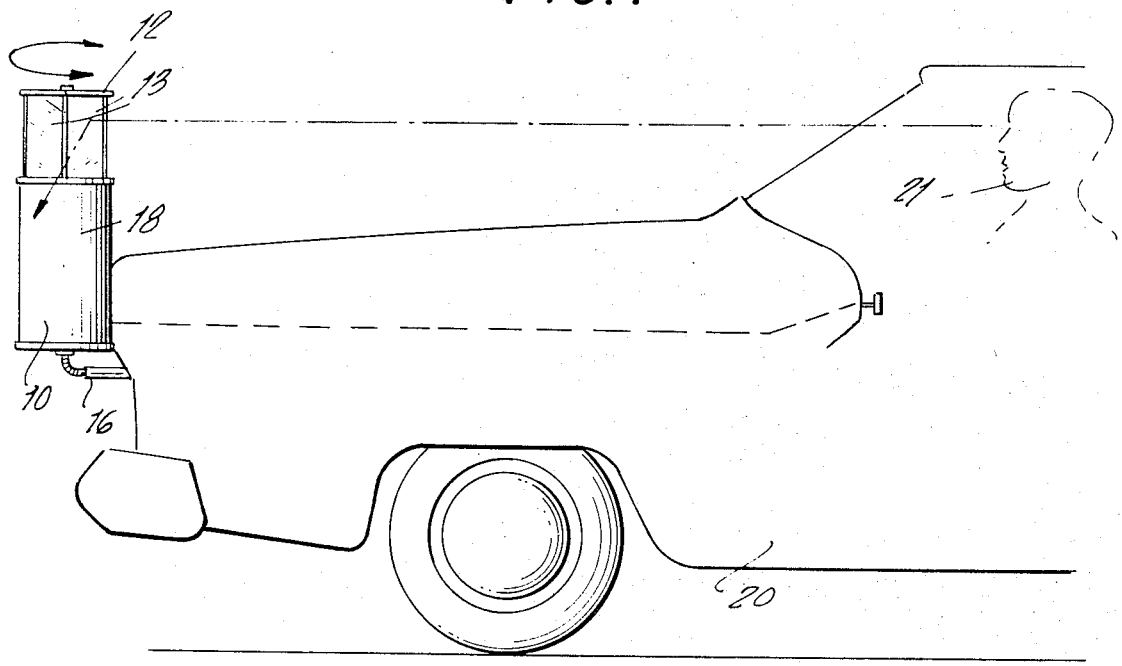
FIG. 1 is a side view of an automobile with the scope raised to the viewing position.
Figure 2:
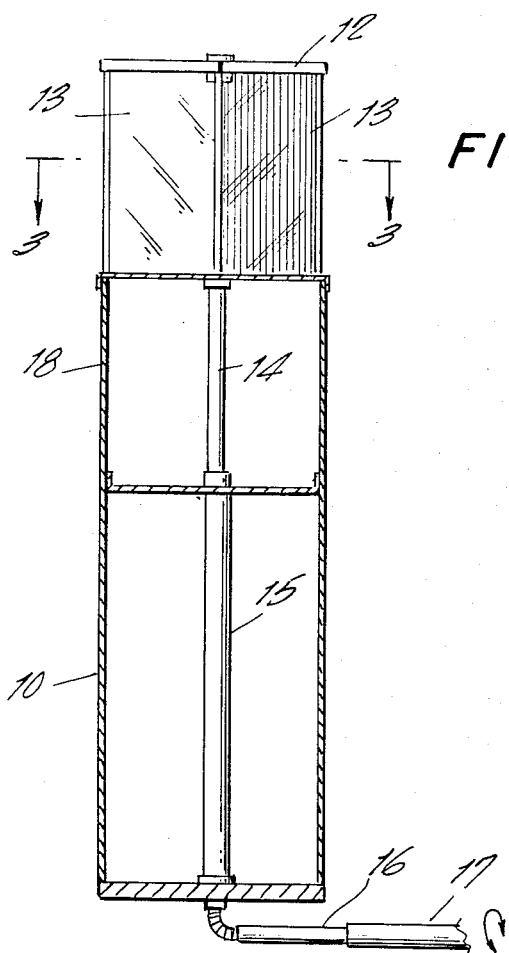
FIG. 2 is an elevation of the scope.
Figure 3:
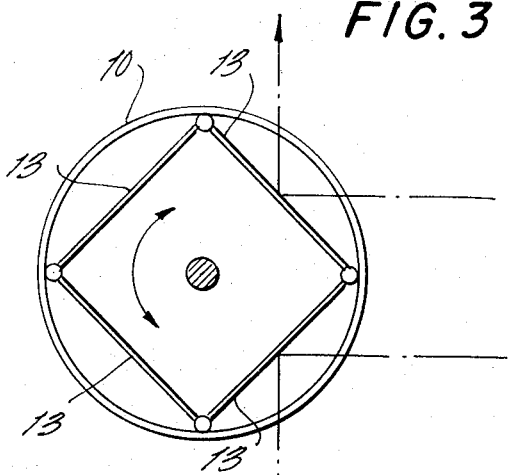
FIG. 3 is a cross-section at line 3—3 of FIG. 2.

Turning now descriptively to the drawings, in which similar reference characters denote similar elements throughout the several views, FIG. 1 illustrates a motorist 21 observing the area to the immediate side of the front of his car 20, as the scene is reflected by mirrors 13. The mirrors 13 are mounted at an angle to each other so as to furnish a view of both sides to the motorist, and are shown in the preferred embodiment as four sides of a cube, with a protective cap 12 over the mirrors.

The entire unit 10 is mounted from the front of the automobile by tube 17, with means to support inner tube 16 fastened to the assembly. Control means inside the automobile enable the driver to rotate tube 16 with regard to tube 17 so as to rotate the entire scope assembly 10 to the horizontal position below the top of the automobile engine hood 22, once the automobile has reached the open road. Remote control means are also available inside the automobile to rotate support member 14 with regard to tube 15 so as to vary the angle of view of the mirrors 13. Support tube 14 also may be controlled to retract inside of tube 15 so as to retract the mirror surfaces 13 inside of the housing 18, when not in use.

Since the obvious changes may be made in the specific embodiment of the invention described herein without departing from the scope thereof, it is indicated that all matter contained herein is intended to be interpreted in an illustrative and not a limiting sense.

Having thus described my invention, what I claim as new and desire to secure by Letters Patent of the United States is:

1. A retractable mirror device mounted on the front of an automobile, with means to extend the mirror elements above the level of the engine hood, said mirror elements consisting of two or more mirror planes mounted at angles to each other about a vertical axis, with means responsive to the motorist to rotate the mirror elements about the vertical axis so as to enable the motorist to view the side areas in the immediate vicinity of the front of the automobile, said mirror elements being retractable into a fixed cylindrical housing mounted below the top of the automobile hood, when not in use, with the mirror elements being completely enclosed in the retracted position, and with the means for rotating the mirror elements about a vertical axis, and the means for retracting the mirror elements into the cylindrical housing, responsive to controls within reach of the driver of the automobile.

* * * * *